(12) United States Patent
Kashyap et al.

(10) Patent No.: US 8,245,262 B2
(45) Date of Patent: Aug. 14, 2012

(54) SYSTEM AND METHOD FOR SYNCHRONIZATION OF TELEVISION SIGNALS ASSOCIATED WITH MULTIPLE BROADCAST NETWORKS

(75) Inventors: Praveen Kashyap, Irvine, CA (US); Xing Zheng, Irvine, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 549 days.

(21) Appl. No.: 12/098,989

(22) Filed: Apr. 7, 2008

(65) Prior Publication Data

US 2009/0251599 A1    Oct. 8, 2009

(51) Int. Cl.
*H04N 7/173* (2011.01)

(52) U.S. Cl. ........ 725/116; 725/105; 725/131; 725/144; 725/151

(58) Field of Classification Search .................... 725/86, 725/101, 114, 116, 131, 133, 144, 146, 151, 725/153

See application file for complete search history.

(56) References Cited

U.S. PATENT DOCUMENTS

| | | | |
|---|---|---|---|
| 4,739,398 A | 4/1988 | Thomas et al. | |
| 4,931,871 A | 6/1990 | Kramer | |
| 5,572,246 A | 11/1996 | Ellis et al. | |
| 7,555,196 B1 * | 6/2009 | Crawford et al. | 386/241 |
| 2003/0002849 A1 | 1/2003 | Lord | |
| 2004/0231003 A1 * | 11/2004 | Cooper et al. | 725/135 |
| 2006/0002681 A1 * | 1/2006 | Spilo et al. | 386/46 |
| 2008/0066100 A1 * | 3/2008 | Brodersen et al. | 725/35 |
| 2009/0044229 A1 * | 2/2009 | Taylor | 725/62 |

* cited by examiner

*Primary Examiner* — Farzana Hossain
(74) *Attorney, Agent, or Firm* — Beyer Law Group LLP (57) ABSTRACT

Embodiments include a system and method of synchronizing broadcast signals from multiple broadcast networks on televisions or other media devices. One embodiment includes a method comprising receiving signatures or other data indicative of each of a plurality of video frames from each of a plurality of video devices, each of the video devices having received the frame from a video broadcast. At least one of the video frames is identified as being received by each of the video devices based on the received data. A request or other data indicative of a time to display the one of the video frames is communicated to each of the plurality of video devices. Other embodiments include media devices configured to send such frame data and to display video frames at the indicated time.

22 Claims, 9 Drawing Sheets

SYSTEM AND METHOD FOR SYNCHRONIZATION OF TELEVISION SIGNALS ASSOCIATED WITH MULTIPLE BROADCAST NETWORKS

BACKGROUND OF THE INVENTION

1. Field of the Invention

This application relates to digital video. In particular, this application relates to synchronizing display of broadcast video signals.

2. Description of the Related Technology

Shared viewing of broadcast television shows with friends and family has long added to the viewing experience. For example, live sports broadcasts are often viewed and enjoyed by groups of people. Improved telecommunications, including telephone and video conferencing, text or voice chat applications and so on provide a way for people to create virtual viewing groups over a wide geographic area. Accordingly, a need exists for ways of providing distributed viewing of broadcast television signals.

SUMMARY OF CERTAIN INVENTIVE ASPECTS

The system, method, and devices of the invention each have several aspects, no single one of which is solely responsible for its desirable attributes. Without limiting the scope of this invention as expressed by the claims which follow, its more prominent features will now be discussed briefly. After considering this discussion, and particularly after reading the section entitled "Detailed Description of Certain Embodiments" one will understand how the features of this invention provide advantages that include substantially synchronized viewing of broadcast video signals.

One embodiment includes a method of synchronizing broadcast video signals. The method includes receiving a frame of a broadcast video signal, generating data indicative of the received frame, communicating the data indicative of the received frame to a server, receiving data indicative of a time to display the received frame from the server, and outputting the received frame to a display substantially at the indicated time.

One embodiment includes a method of synchronizing broadcast video signals. The method comprises receiving data indicative of each of a plurality of video frames from each of a plurality of video devices, each of the video devices having received the frame from a video broadcast. The method further comprises identifying at least one of the video frames as being received by each of the video devices based on the received data and communicating data indicative of a time to display the at least one of the video frames to each of the plurality of video devices.

One embodiment includes system for synchronizing broadcast video signals. The system comprises a receiver configured to receive a frame of a broadcast video signal and at least one processor configured to: generate data indicative of the received frame, communicate the data indicative of the received frame to a server, receive data indicative of a time to display the received frame from the server, and output the received frame to a display substantially at the indicated time.

One embodiment includes system for synchronizing broadcast video signals. The system comprises means for receiving a frame of a broadcast video signal and means for processing. The processing means is configured to: generate data indicative of the received frame, communicate the data indicative of the received frame to a server, receive data indicative of a time to display the received frame from the server, and output the received frame to a display substantially at the indicated time.

One embodiment includes a computer-program product for synchronizing broadcast video signals. The product comprises a computer-readable medium having stored thereon codes executable by at least one processor to: receive a frame of a broadcast video signal, generate data indicative of the received frame, communicate the data indicative of the received frame to a server, receive data indicative of a time to display the received frame from the server, and output the received frame to a display substantially at the indicated time.

One embodiment includes system for synchronizing broadcast video signals. The system comprises a memory configured to store data indicative of each of a plurality of video frames from each of a plurality of video devices, each of the video devices having received the frame from a video broadcast. The system further comprises at least one processor configured to: identify at least one of the video frames as being received by each of the video devices based on the stored data, communicate data indicative of a time to display the at least one of the video frames to each of the plurality of video devices.

One embodiment includes a computer-program product for synchronizing broadcast video signals. The product comprises a computer-readable medium having stored thereon codes executable by at least one processor to: receive data indicative of each of a plurality of video frames from each of a plurality of video devices, each of the video devices having received the frame from a video broadcast. The computer-readable medium further has stored thereon codes executable by the at least one processor to identify at least one of the video frames as being received by each of the video devices based on the received data, and communicate data indicative of a time to display the at least one of the video frames to each of the plurality of video devices.

DETAILED DESCRIPTION OF CERTAIN EMBODIMENTS

The following detailed description is directed to certain specific embodiments of the invention. However, the invention can be embodied in a multitude of different ways as defined and covered by the claims. In this description, reference is made to the drawings wherein like parts are designated with like numerals throughout.

When broadcast television is received by members of a geographically distributed group, the group members may receive the television signals from different television stations in different geographic or television markets or different television signal distribution methods (for example, the same television station signal may be received by different viewers via an over-the-air antenna, a cable television systems, or satellite television systems). The different sources of the broadcast television signals have varying timing of the received program due to, for example, varying transmission paths and latencies, different latencies incurred by varying signal encoders and encoder technologies, or intermediate relay of the signals. Thus, for example, some viewers in a geographically distributed group of viewers may see or hear the reaction of other virtually present viewers before they view the event itself due to the varying delays. For example, viewers of a particular broadcast signal may not see a score in a sporting event until after hearing the reaction of their friends, thus spoiling the shared viewing experience.

One embodiment includes a way of allowing people to view a broadcast television program with substantially synchronization of the broadcast signals. Hence, in one embodiment, a group of viewers receiving broadcast video signals via different broadcast paths can enjoy a substantially synchronized television viewing experience. In one embodiment, the synchronization is frame accurate. In one embodiment, one or more of the viewers may pause, fast forward, rewind and stop the program substantially in a synchronized fashion on each viewer's television.

As used herein, "television" broadly refers to any a device or system for displaying broadcast video signals regardless of the source of such signals. Television broadcast signals may include, for example, terrestrial digital television broadcast signals, broadcast satellite signals, or cable television broadcast signals. Further, a television may include one or both of a receiver for receiving the television signals and a monitor for displaying the signals. The receiver may be integrated in the housing of the monitor or may be housed separately as in a cable or satellite set top box or digital video recorder.

Figure 1:
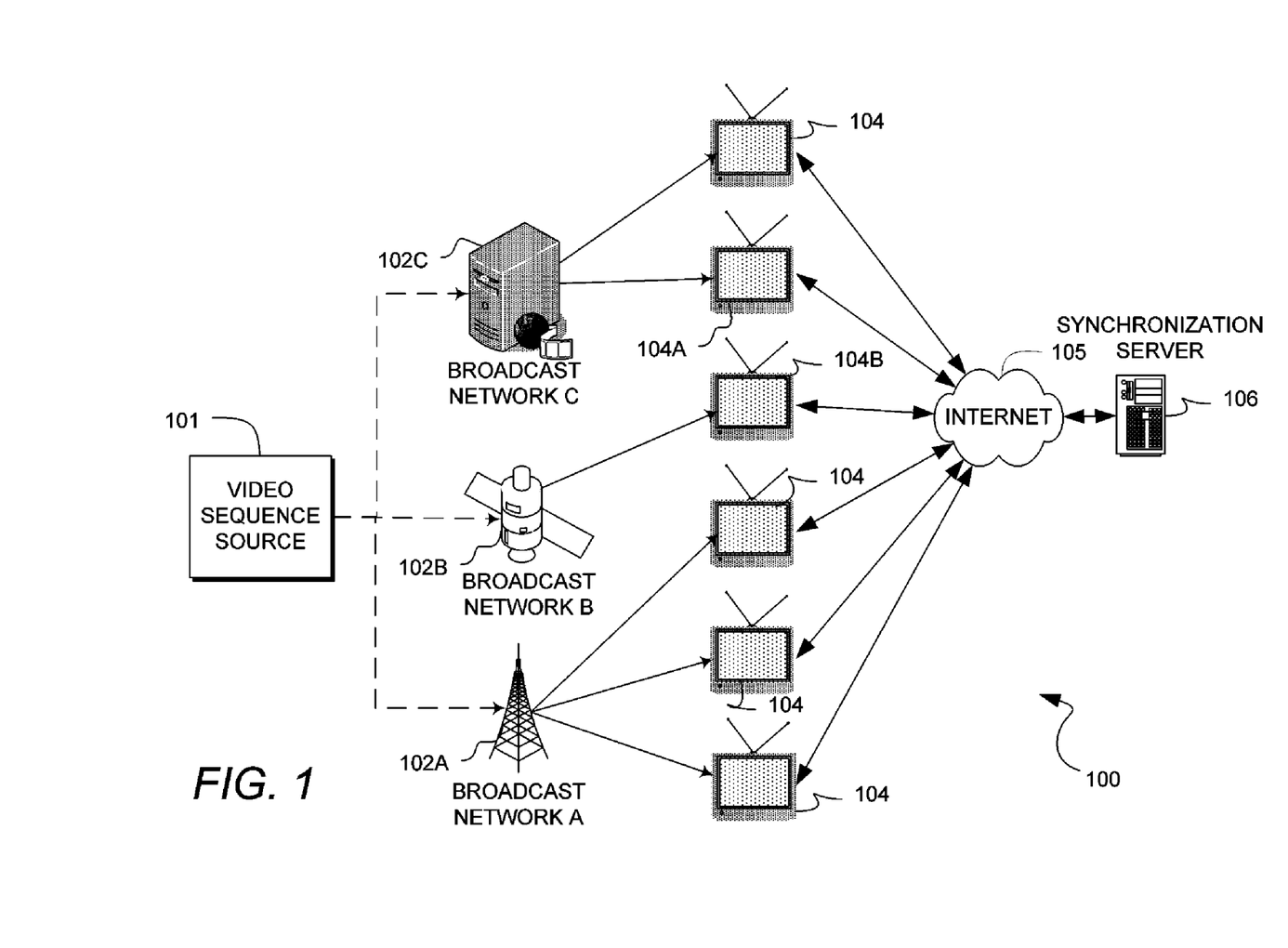
FIG. 1 is a block diagram illustrating components of one embodiment of a system for providing television or other broadcast video signals to two or more displays for synchronized viewing.

FIG. 1 is a block diagram illustrating components of one embodiment of a system 100 for providing television or other broadcast video signals to displays for synchronized viewing. A source 101 may feed a video signal, which may comprise a sequence of frames, provides the signal to a two or more broadcast networks 102. The broadcast networks transmit the video signal to one or more media devices 104. The media devices 104 are connected via a network 105, such as the Internet, to a synchronization server 106.

The broadcast networks 102 may include, for example, the broadcast network 102A may comprise a terrestrial digital television broadcast station 102A, the network 102B may comprise a direct satellite broadcast network, and the network 102B may comprise a data network based broadcast system. Each broadcast network 102 provides its feeds to one or more media devices 104.

Feeds of the video signal to each of the broadcast networks 102 may be substantially concurrent with the transmission of the signal by the broadcast network 102. Alternatively, the source 101 may provide the video signal to the broadcast network 102 for storage and later broadcast of the signal. Alternatively, the source 101 may provide the video signal on a fixed medium such as a tape or disk recording. In any case, the transmission of the video signal by the broadcast networks 102 of a particular program may be at slightly varying times with respect to each other due to variation in start times, varying delays in signal transmission and retransmission to transmission sites, slight variations in commercial breaks, and so forth. Moreover, in some cases one of the broadcast networks 102 may act as an intermediate source of the video signal for others of the broadcast networks 102. For example, the satellite broadcast network 102B may retransmit the signal of a particular terrestrial television network 102A.

The media devices 104 may comprise televisions, e.g., a combined receiver/display, or a set-top box or video recorder that receives the video signal from the broadcast network and provides it to a separate display. When each media device 104 receives the video signal from an available one of the broadcast networks 102, the media device 104 generates a signature for some or all of the frames in the video sequence and transmits those signatures to the synchronization server 106. A signature of a frame comprises data that identifies and distinguishes each frame from other video frames in the video signature. For example, the signatures may comprise a digest value or other hash value calculated for at least a portion of a particular frame. It is to be recognized that the signatures generated may be hash values that are not guaranteed to be unique, but which are sufficiently unlikely to be the same that any collisions can be ignored.

Frames of a video signal are generally provided at a particular frame rate, e.g., 24, 30, 50, or 60 frames per second. In one embodiment, the media devices 104 generates signatures for each such frame. In other embodiments, the media devices 104 select frames for which signatures are generated by selecting frames at a selected or predefined interval, e.g., at an interval of 0.2-1 second, an interval of 1-5 seconds, etc. In one embodiment, the intervals between generated signatures are based on the content of the video signal. For example, signatures may be generated for each "I-frame" in a compressed video signal (an I-frame such as in an MPEG compression standard is a frame that can be decoded without reference to other frames in the signal). In one embodiment, the media device 104 generates a signature for each frame, but transmits only the signatures of selected frames to the server 106.

In one embodiment, the signatures may be generated based on an interval or range of frames beginning, ending, or otherwise including the particular frame. Various examples of suitable methods and systems of generating such signatures are disclosed in U.S. Pat. Nos. 4,739,398, 4,931,871, and 5,572,246, which are hereby incorporated by reference in their entireties. In one embodiment, only particular portions of the frames are used in generating the signatures and/or particular portions of the frames are ignored so that station logos or "bugs" that may be continuously displayed, but which may vary from network 102 to network 102 do not prevent synchronization.

The synchronization server 106, which may comprise any suitable computer system adapted to communicate over a data network such as the network 105, receives the calculated frame signature data from each media device 104 in a particular synchronized group of media devices 104 and stores that signature data to a memory. The server 106 matches the frame signatures received from each media device 104. When matching frames are identified, the server 106 communicates a request or instruction to each media device 104 to display the matching frame at a particular time. The time may be relative to a clock on each media device 104. In one embodiment, each of the media devices synchronizes its clock with the server 106 using any suitable network time synchronization method or protocol. In one embodiment, one or more of the media devices 104 adjusts its clock based on a time signal received via the broadcast network 102 or via a global position system (GPS) receiver (not shown) attached to, or otherwise associated with, the media device 104.

In one embodiment, synchronized groups of media devices 104 may be established via a user interface on the media device 104 that provides users with screens for creating, selecting, and/or controlling access to a particular group maintained by the synchronization server 106. In another embodiment, a separate computer, e.g., via a web browser, registers an identifier of the media device 104 with the synchronization server 116. In other embodiments, any other suitable method of creating and maintaining synchronization groups may be used. For example, the synchronization groups may be associated with, or maintained by, chat or other telepresence software that is used during the synchronized viewing to allow the users to share the viewing experience. In one embodiment, the media device 104 provides an interface to text, voice, or video-conferencing functions that are provided along with the synchronized video signal. In one embodiment, the media devices 104 also provide an interface for identifying the broadcast program to be synchronized. In one embodiment, the media device 104 also provides the interface for selecting the program via an interactive program guide.

Figure 2:
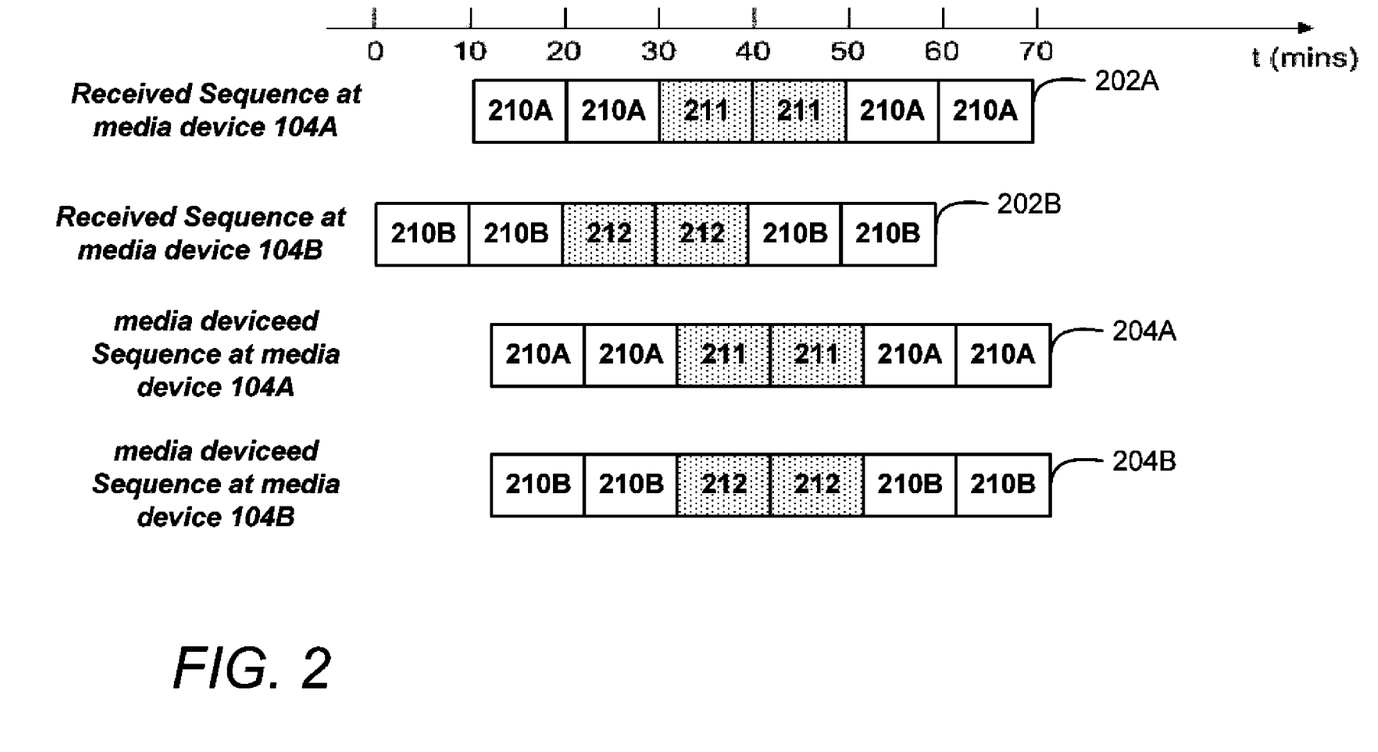
FIG. 2 is a diagram illustrating the timing of video signals as received and displayed on two or more displays according to one embodiment of a system such as illustrated in FIG. 1.

FIG. 2 is a diagram illustrating the timing of video signals as received and displayed on two media devices 104, e.g., media devices 104A and 104B, from different broadcast networks 102, according to one embodiment of the system 100. Video sequences 202 and 204 illustrate sequences of frames or intervals of frames 210 of the same source video signal that include intervening frame intervals 211 and 212 of commercials or other content specific to the different broadcast networks. Thus, the frames in the intervals 211 of sequence 202A may differ from the frames 212 of the sequence 202B while the frames 210A and 210B of the sequences 202A and 202B, respectively, are the same. As illustrated in the example of FIG. 2, the frame sequence 202B is received at the media device 202B beginning at a time t=0 while the sequence 202A is received at the media device 104B beginning at a time t=10 minutes.

In one embodiment, the media servers 104A and 104B communicate signatures of particular frames to the synchronization server 106. In one embodiment, each media server 104 communicates signatures indicative of one or more frames of each block 210, 211, and 212 to the synchronization server 106. For matching frames such as those in blocks 210A and 210B, the synchronization server 106 sends a request to the media devices 104A and 104B to display the frames at a particular time, e.g., $t_s=10+\alpha$, where $\alpha$ corresponds to a latency for communications between the devices and for the server 106 to identify that match. The sequences 204A and 204B illustrate the relative timing of the output video sequences corresponding to sequences 202A and 202B, respectively, beginning at time $t_s$.

In one embodiment, for non-matching frames such as in the blocks 211 and 212, the media devices 104 display the frames 211 and 212 in sequence order with previously synchronized frames when no display requests are received from the server.

Figures 3A, 3B:
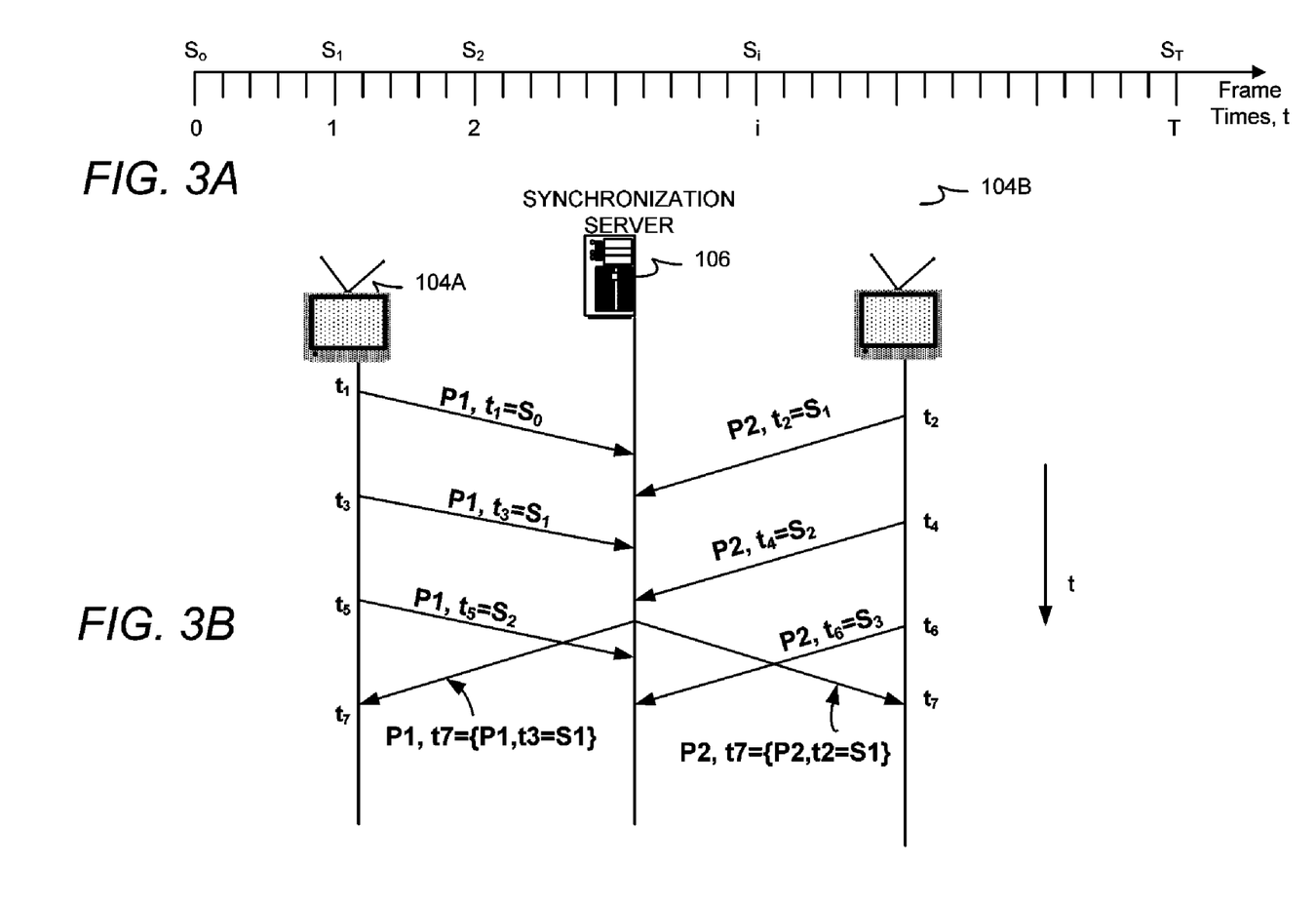
FIG. 3A is a timeline illustrating the relative times of frames in a particular example of a video sequence.
FIG. 3B is a timing diagram illustrating an example of communication of frame synchronization data based on the frame sequence of FIG. 3A between a synchronization server and two displays in a system such as illustrated in FIG. 1.

FIG. 3A is a timeline illustrating the relative times of frames in a particular example of a video sequence as received by two media devices 102A and 102B. In the illustrated example, a signature $S_i$ is generated at a particular interval (e.g., per frame or number of frames or every 0.5 seconds) over a period of time interval for the particular video sequence, $0<=t<=T$. As noted above, any suitable method of generating signatures indicative of a frame and/or an interval that includes the frame may be used.

FIG. 3B is a timing diagram illustrating an example of communication of frame synchronization data based on the frame sequence of FIG. 3A between the synchronization server 106 and two media devices 104A and 104B in the system 100. In the example of FIG. 4A, a group of synchronized devices includes only the media devices 104A and 104B. During broadcast of the program, a particular media device 104 generates video frame signatures $S_i$ for each received frame Pj,t, where j is the media device identifier or address and t is the receiving time of the frame. In this example, the media device identifier for device 104A is 1 and for 104B is 2. Each of the media devices 104A and 104B communicates messages to the server 106 at different times depending on when each of device 104A and 104B receives particular frames. In the illustration of FIG. 4, a message description in the form "$P_{1,t3}=S_1$" means media device 104A (device 1) receives a video frame with signature $S_1$ at time $t_3$. In the example, the media device 104A sends signatures S0, S1, and S2 at times t1, t3, and t5 while the media device 104B sends signatures S1, S2, and S3 and times t2, t4, and t6, respectively.

After analyzing signatures from different media devices 104, the server 106 communicates display messages to the media devices 104 that include a time for each device to display the frame indentified by the corresponding signature. In the example of FIG. 4,1 after recognizing both the media devices 104A and 104B have received the video frame identified with the signature $S_1$, the server 106 communicates a display request to display the same frame, the frame indicated by the signature $S_1$, received by the media device 104A at $t_3$ and by the media device 104B at $t_2$, at the same time, $t_7$. For purposes of illustration in FIG. 3B, any communication delays between the devices 104 and the server 106 and processing time on the server 106 are ignored.

Figure 4:
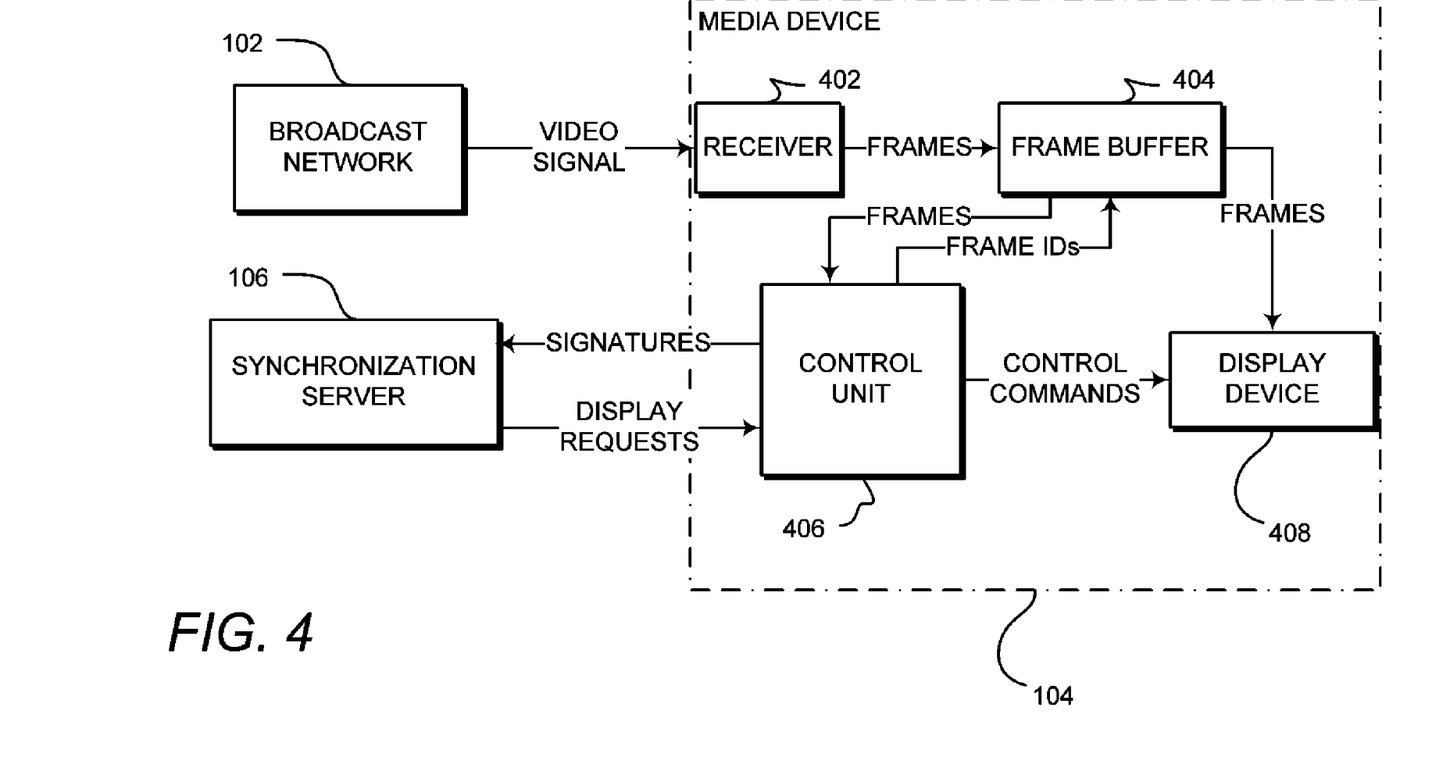
FIG. 4 is a block diagram illustrating one embodiment of a display configured to output synchronized broadcast video in a system such as illustrated in FIG. 1.

FIG. 4 is a block diagram illustrating one embodiment of the media device 104 configured to output synchronized broadcast video in the system 100. The media device 104 may include a receiver 402 that receives the broadcasts from a particular broadcast network 102. The receiver 402 outputs the frames to a frame buffer 404 that stores the frames until displayed. A control unit 406 generates signatures based on the frames and communicates the signature data to the synchronization server 106. The control unit 406 receives display requests from the server 106 and controls display of the frames by a display device 408. The display device may receive the frames from the frame buffer 404 and display those frames when directed by the control unit 406.

The receiver 402 may comprise, for example, one or more of a terrestrial digital television receiver, a satellite receiver, and a wired or wireless data network transceiver. The frame buffer 404 may comprise one or both of a solid state memory or a disk memory for storing frames of a video signal for subsequent display. The control unit 406 may comprise one or more processors including general purpose processors and digital signal processors. The display device 408 may comprise any suitable video display device including a direct view display such as an LCD or plasma display or a rear or front projection display. The display device 408 may integrated in the same housing as the other components of the media device 104 such as in a conventional television. Alternatively, the display device 408 may be a separate device with the other components of the media device 104 forming a set-top box or video recorder.

Those of skill will recognize that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Figure 5:
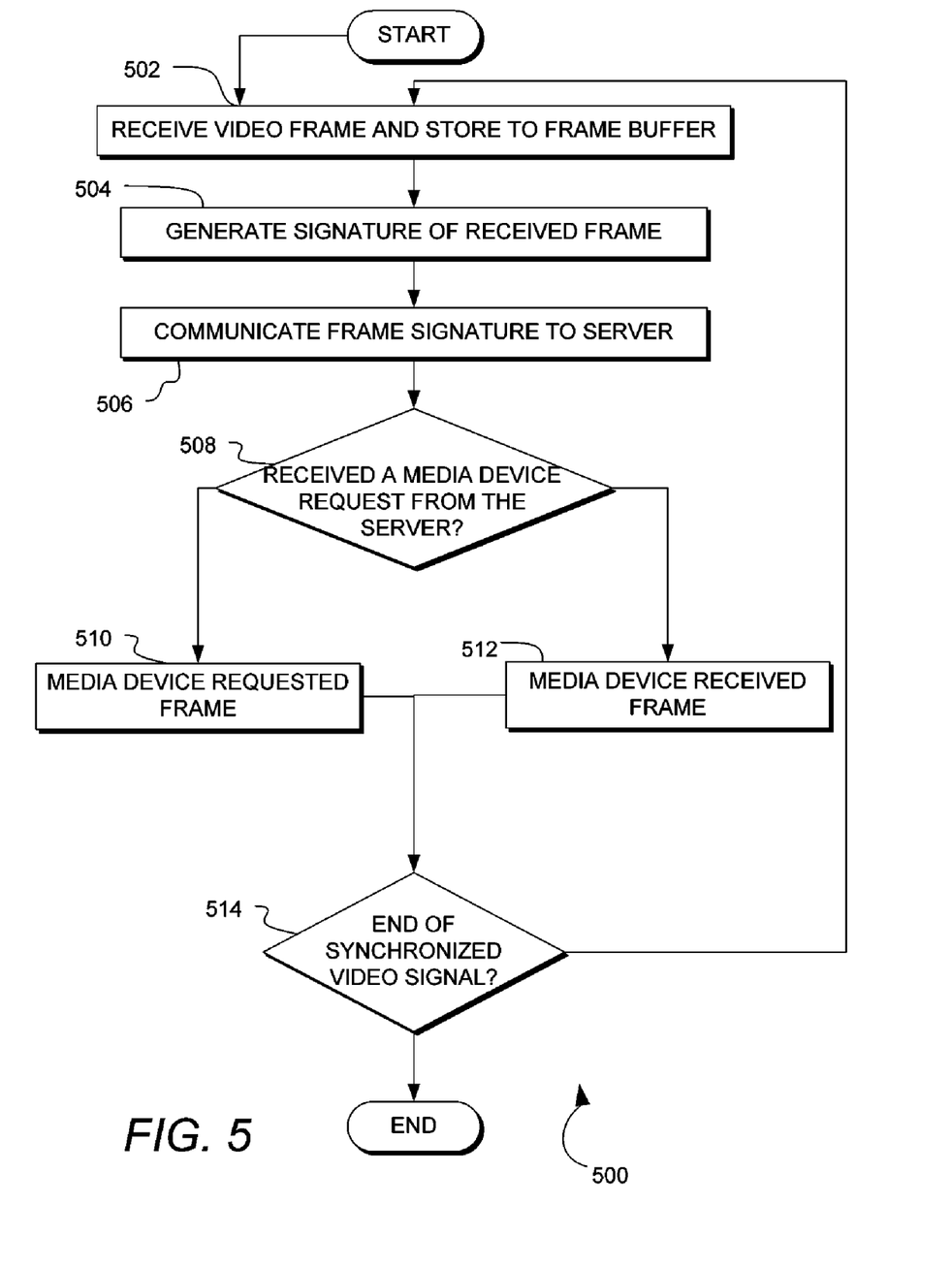
FIG. 5 is a flowchart illustrating one embodiment of a method of synchronizing display of broadcast video such as in the display illustrated in FIG. 4.

FIG. 5 is a flowchart illustrating one embodiment of a method 500 of synchronizing display of broadcast video such as in the media device 104. The method begins at a block 502 in which the media device 104 receives a frame and stores it to the frame buffer 404 (see FIG. 4). Next at a block 504, the media device 104 generates a signature indicative of the received frame. The signature may be based on the frame and/or an interval of frames that includes the frame. Moving to a block 506, the media device 104 communicates the signature to the synchronization server 106.

Proceeding to a block 508, the media device 104 determines whether a display request has been received from the synchronization server 106. In one embodiment, the media device attempts to display the least recently received frame in the frame buffer 404. If a display request has been received for that frame, the method 500 proceeds to a block 510 in which the media device outputs the frame for displayed at that time. If no request has been received by the time that the next frame is to be displayed based on a particular frame rate for the video signal (e.g., based on a frame rate of 24, 30, 50, 60, 100, or 120 frames per second), the method 512 proceeds to a block 512 in which the media device displays the frame at the next frame time.

Thus, once at least an initial frame has been displayed in synchronization based on a request received from the server 106, the media device 104 may display intervening frames (for which no message would be received) according to timing that is based on the frame rate of the video signal to provide a complete frame sequence for display.

Prior to receiving any synchronization requests from the server 106, the media server may display the frames of the received signal as they are received. If the synchronization message specifies a previously displayed portion of the video sequence, the media device 104 may move backward in the frame buffer and begin display of the indicated frame at the indicated time in the first received synchronization request.

Moving to a block 514, the media device 104 determines if the signal should continue to be synchronized. If so, the method 500 returns to the block 502. In one embodiment, the synchronization server 106 may send a message to the media devices 104 to discontinue synchronized display.

Figure 6:
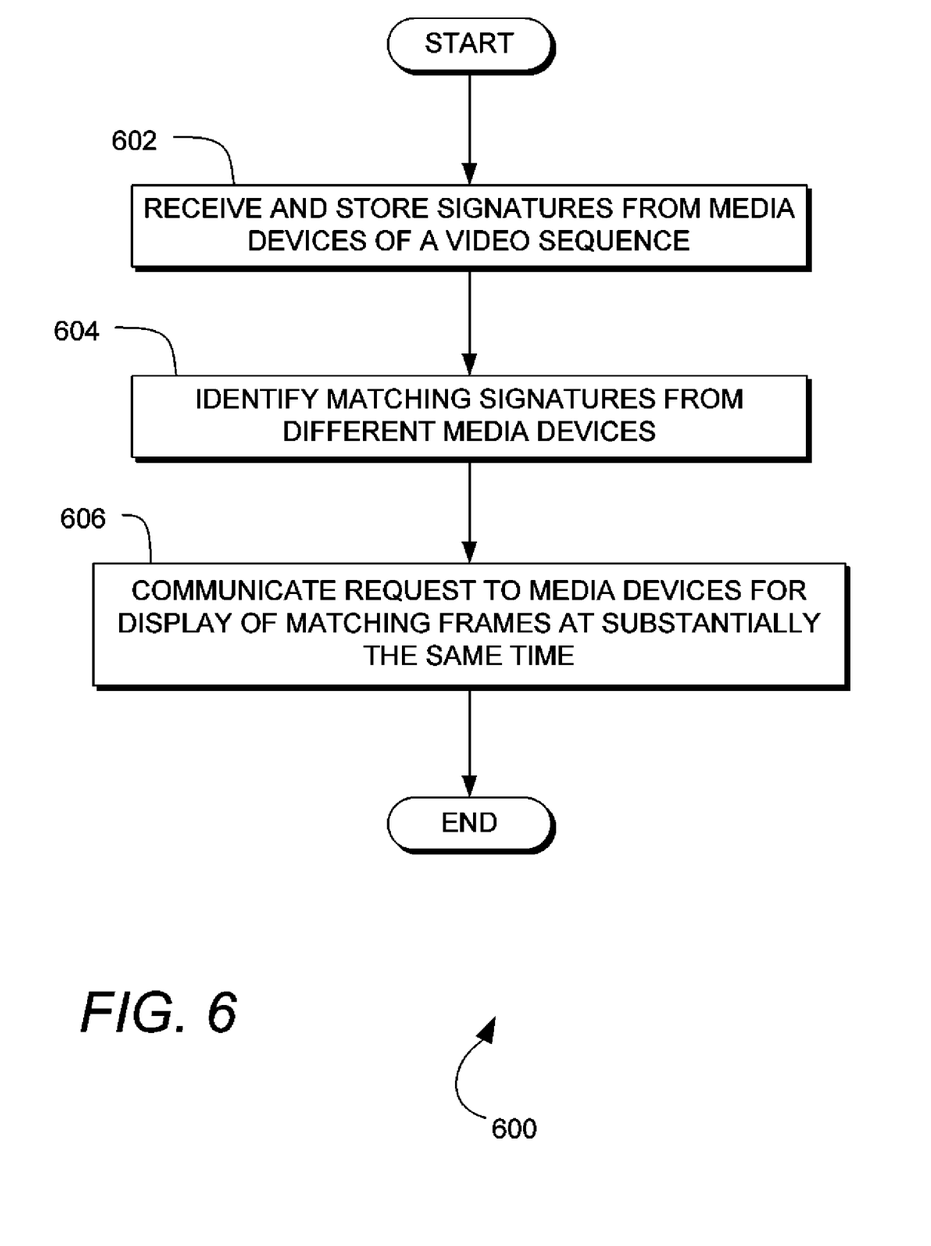
FIG. 6 a flowchart illustrating one embodiment of a method of providing synchronization to displays in a system such as illustrated in FIG. 1.

FIG. 6 a flowchart illustrating one embodiment of a method 600 of providing synchronization to displays by the synchronization server 106. The method begins at a block 602 in which the synchronization server 106 receives signatures from media devices 104 of a video sequence and stores those sequences to a memory. In one embodiment, the server 106 maintains a list or other data structure including frame signature data for each of the media devices 104.

Moving to a block 604, the server 106 identifies matching signatures from different media devices 104. In one embodiment, the server 106 selects the oldest frame signature in the lists and traverses the list of each media device 104 for that frame signature. If no matches are found, the frame is removed from the lists and the search repeated for the next oldest frame. In other embodiments, any suitable search strategy may be employed by the server 106 to perform the matching.

Next at a block 606, the server 106 communicates a request to each of the media devices whose lists at the block 605 include matching frames to display the frames at substantially the same time. Each request may include the signature, the time that the particular media server received the frame, and an identifier of the particular media server.

A particular synchronization server 106 may schedule display of images from one or more different groups of media devices 104. The synchronization server 106 may provide an interface, e.g., a series of web pages, to configure particular groups. Alternatively, the media devices 104 may provide group configuration data to the server 106 to create the one or more groups of media devices and to identify the broadcast program or time period to synchronize.

It is to be recognized that depending on the embodiment, certain acts or events of any of the methods described herein can be performed in a different sequence, may be added, merged, or left out all together (e.g., not all described acts or events are necessary for the practice of the method). Moreover, in certain embodiments, acts or events may be performed concurrently, e.g., through multi-threaded processing, interrupt processing, or multiple processors, rather than sequentially.

Figure 7:
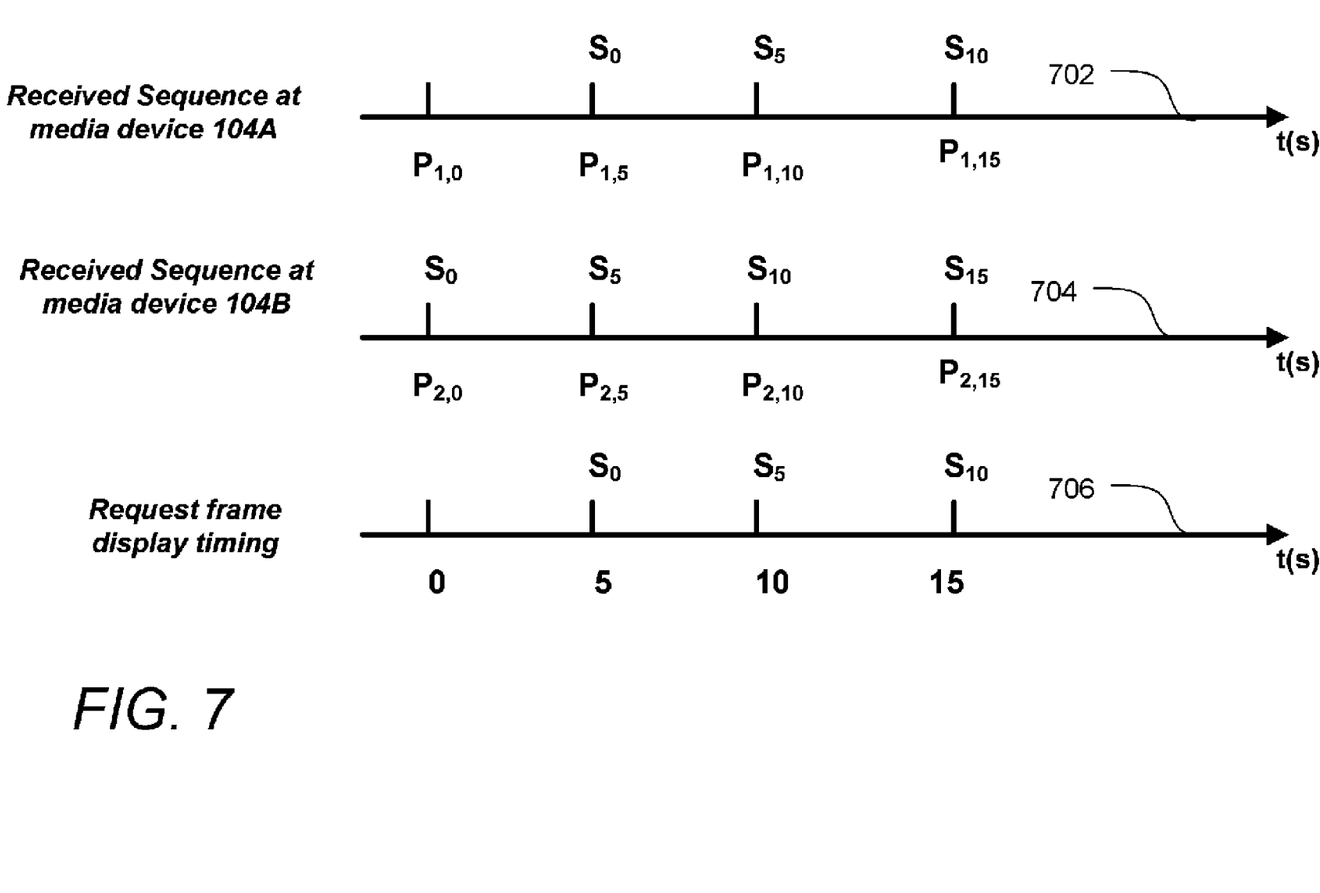
FIGS. 7-9 are timing diagrams illustrating the relative timing of frame synchronization events according to one embodiment of the methods of FIGS. 5 and 6.
Figure 8:
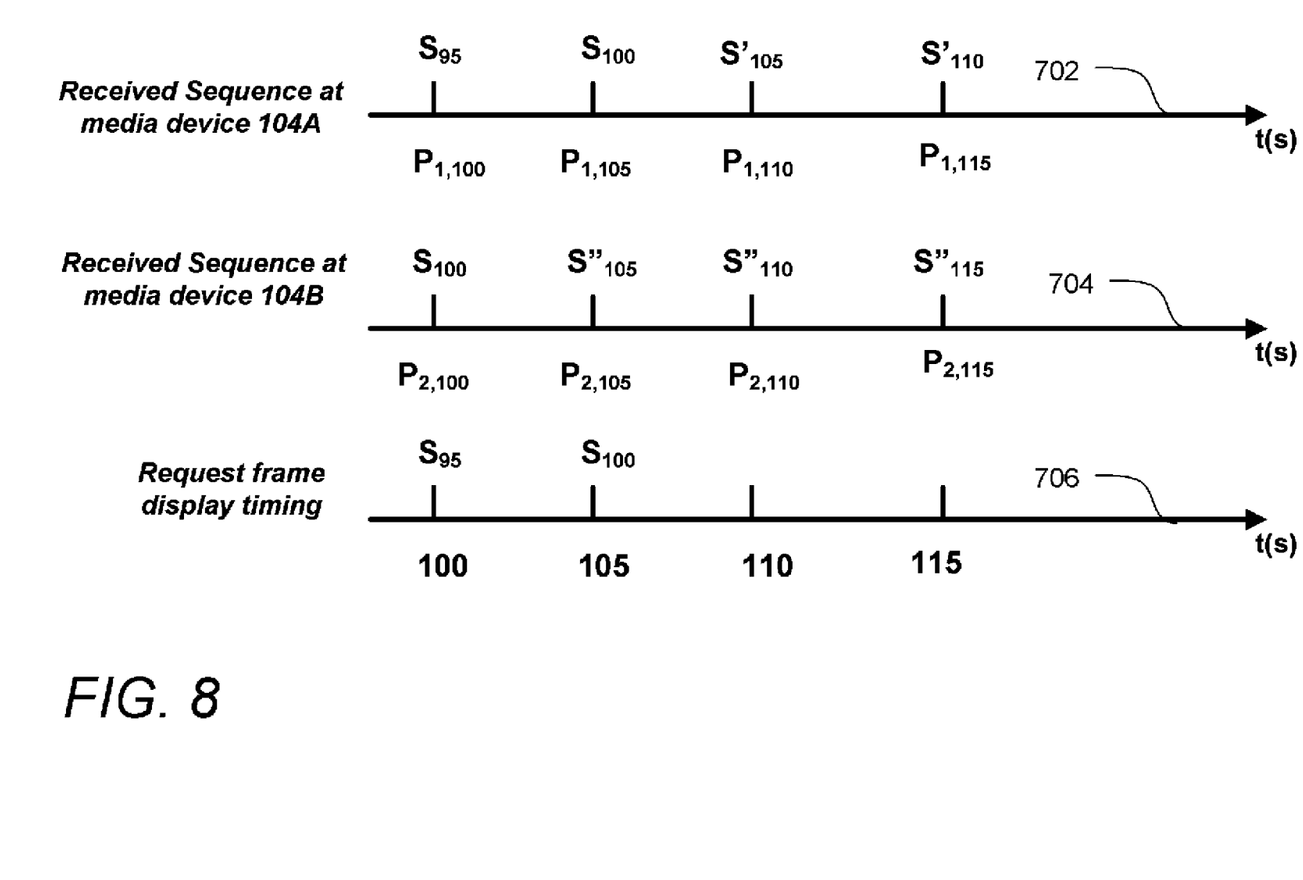
Figure 9:
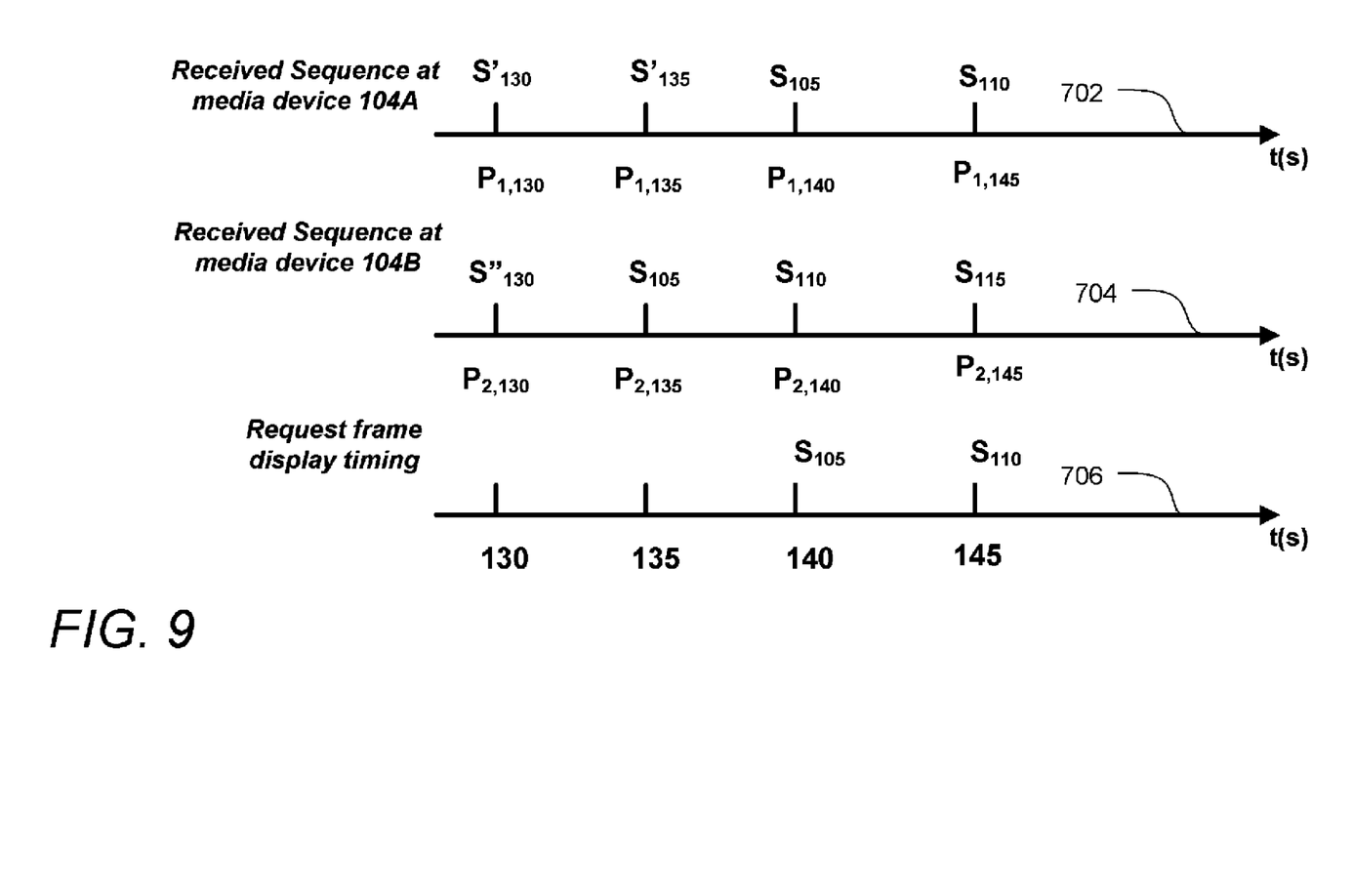

FIGS. 7-9 are timing diagrams illustrating the relative timing of frames and their respective signatures along with frame synchronization events for the two example media devices 104A and 104B of the example of FIG. 3B. In particular, each of FIGS. 7-9 illustrates a trace 702 indicating the timing of receiving frames with particular signatures, e.g., S0, S5, and S10, at the media device 104A. A trace 704 illustrates the timing for received frames for the media server 104B. A trace 706 illustrates the timing of requests for display of the frames with particular signatures.

FIG. 7 illustrates that a particular program to be viewed in synchronization may have different start times on the different media devices 104A and 104B due to differences in the timing of the video signal from the corresponding broadcast networks 102. In particular, in FIG. 7, the media device 104B receives the same frames (indicated by signatures S0, S5, and S10) 5 seconds earlier than the media device 102A. After the server 106 receives signatures from the media servers 104A and 104B for these frames, the server 106 requests that both the devices 104A and 104B display the frames at about the time that the device 104B receives the frames (allowing for a small latency from communications and server processing that is not shown).

As noted in FIG. 2, each broadcast of the video signal may include non-identical intervals during which commercials, station identification, or other differing intervals 211 and 212 of frames are broadcast to at least some of the media devices 104. FIG. 8 illustrates one example of frame synchronization in the system 100 when such intervals 211 and 212 occur. In particular, after each of media servers 104A and 104B receive a frame indicated by S100 at time, t=105 and t=105, respectively, at t=105, the media device 104B receives a frame S"105 while the media server receives a frame S'105 at time, t=110. The server 106 will not match the frames S"105 and S'105 and thus never send a synchronization message for these. Each media device 104 may display these frames as each frame becomes the next frame for display in the sequence according to the frame rate of the sequence. As the two devices 104A and 104B were synchronized for the frame indicated by the signature S100, they may maintain that synchronization by continuing to display their received frames until additional identical frames are received and are further synchronized. It is to be recognized that in initiating synchronization, one or both of the devices may redisplay particular frames or not display particular frames at all.

FIG. 9 continues the traces 702, 704, and 706 to a time range, t=130-145, at the end of the differing intervals 211 and 212 of frames to illustrate re-synchronization after differing frame intervals (which may also differ in length). In FIG. 9 the media devices 104A and 104B receive a first matching frame signature S105 at times t=140, and t=135, respectively, after receiving non-matching signatures S'130, S"130 and S'135. Thus, the server 106 requests that each media device 104A and 104B displays the frame indicated by signature S105 at the same time, e.g., at about t=140.

The steps of a method or algorithm described in connection with the embodiments disclosed herein may be embodied directly in hardware, in a software module executed by a processor, or in a combination of the two. A software module may comprise one or more of software and/or firmware and reside in one or more of RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. As will be recognized, the present invention may be embodied within a form that does not provide all of the features and benefits set forth herein, as some features may be used or practiced separately from others. The scope of the invention is indicated by the appended claims rather than by the foregoing description. All changes which come within the meaning and range of equivalency of the claims are to be embraced within their scope.

What is claimed is:

1. A method of synchronizing broadcast video signals, the method comprising:
   receiving a frame of a broadcast video signal from a first TV station at a first video device;
   receiving the frame from a second TV station at a second video device;
   generating a signature of the received frame;
   communicating the signature of the received frame to a server, wherein the server receives the signature of received frames from the first device and from the second device;
   maintaining a first list of frame signatures for the first video device and a second list of frame signatures for the second video device;
   selecting an oldest signature from the first list and the second list;
   comparing the oldest signature with other signatures in the first list and the second list;
   identifying a matching signature that matches the oldest signature;
   upon identifying the matching signature, determining a single time to display the frame on the first video device and on the second video device, said frame corresponding to the oldest signature;
   creating a request at the server to be transmitted to the first device and to the second device, said request including the time when the first device and the second device should display the frame and the frame signature;
   receiving, at the first video device and at the second video device, the time to display the received frames from the server; and
   outputting the received frame to a first display of the first device and to a second display of the second device.

2. The method of claim 1, further comprising displaying the received frame substantially at the time.

3. The method of claim 1, wherein the time to display the received frame is based on at least one of a request to pause, rewind, or fast forward the video signal.

4. The method of claim 1, further comprising substantially synchronizing a clock with the server, wherein the time is with reference to the clock.

5. The method of claim 1, wherein the different types of broadcast networks comprise at least two of: over-the-air, cable and satellite.

6. The method of claim 5, wherein the received frame of the at least two video devices have different transmission paths and latencies.

7. The method of claim 1 wherein the request further includes a time that a particular video server received the frame and an identifier of the particular video server.

8. The method of claim 1 further comprising:
   discarding the oldest signature in the lists if there is no matching signature found; and performing a comparison of the next oldest signature in the lists.

9. A method of synchronizing TV signals from two or more TV stations, the method comprising:
   receiving, at a synchronization server, signatures of each of a plurality of video frames from a first video device and from a second video device, wherein the first video device receives a frame from a first TV station and the second video device receives the frame from a second TV station;
   maintaining a first list of frame signatures for the first video device and a second list of frame signatures for the second video device;
   selecting an oldest signature from the first list and the second list;
   comparing the oldest signature with other signatures in the first list and the second list;
   identifying a matching signature that matches the oldest signature;

upon identifying the matching signature, determining a single time to display the frame on the first video device and on the second video device, said frame corresponding to the oldest signature;

communicating a request to display the at least one of the video frames to the first video device and the second video device; and synchronizing the at least one of the video frames for synchronized display on the first video device and on the second video device.

10. The method of claim 9, wherein identifying the at least one of the frames comprises matching the data indicative of each of the video frames from a first of the video devices to the data indicative of each of the video frames from each of the other video devices.

11. The method of claim 9, further comprising substantially synchronizing a clock with each of the video devices, wherein the time is with reference to the clock.

12. A system for synchronizing broadcast video signals, the system comprising:

a first receiver in a first video device configured to receive a frame of a TV signal from a first TV station;

a second receiver in a second video device configured to receive the frame from a second TV station;

at least one processor configured for:

generating a signature data of the received frame; and communicating the signature of the received frame to a server, wherein the server receiving the signature of received frames from the first video device and from the second video device;

maintaining a first list of frame signatures for the first video device and a second list of frame signatures for the second video device;

selecting an oldest signature from the first list and the second list;

comparing the oldest signature with other signatures in the first list and the second list;

identifying a matching signature that matches the oldest signature; upon identifying the matching signature, determining a single time to display the frame on the first video device and on the second video device, said frame corresponding to the oldest signature;

creating a request at the server to be transmitted to the first device and to the second device, said request including, the time when the first device and the second device should display the frame and the frame signature;

receiving, at the first video device and at the second video device, the time to display the received frame from the server; and outputting the received frame to a first display of the first video device and to the second video device substantially at the indicated time.

13. The system of claim 12, further comprising a display configured for displaying the received frame substantially at the time.

14. The system of claim 12, wherein the system comprises at least one of a television, a set-top box, or a video recorder.

15. The system of claim 12, wherein the data indicative of the received frame comprises a signature.

16. The system of claim 12, wherein the data indicative of a time to display the received frame comprises a request to display the received frame at the time.

17. The system of claim 16, wherein the data indicative of the time to display the received frame is based on at least one of a request to pause, rewind, or fast forward the video signal.

18. The system of claim 12, wherein the processor is further configured for communicating a request to affect the timing of display of the broadcast video signal.

19. The system of claim 18, wherein the request to affect the timing comprises at least one of a request to pause, rewind, or fast forward the video signal.

20. The system of claim 12, wherein the processor is configured for substantially synchronizing a clock with the server, wherein the time is with reference to the clock.

21. The system of claim 12, further comprising a transceiver configured for communicating data over a network between the processor and the server.

22. A computer-program product for synchronizing broadcast video signals comprising:

a non-transitory computer-readable medium comprising codes executable by at least one processor for:

receiving signatures of each of a plurality of video frames from a first video device and from a second video device wherein the first video device receives a frame from a first TV station and the second video device receives the frame from a second TV station;

maintaining a first list of frame signatures for the first video device and a second list of frame signatures for the second video device;

selecting an oldest signature from the first list and the second list;

comparing the oldest signature with other signatures in the first list and the second list;

identifying a matching signature that matches the oldest signature;

upon identifying the matching signature, determining a single time to display the frame on the first video device and on the second video device, said frame corresponding to the oldest signature;

synchronizing the at least one of the video frames for synchronized display on the first video display and on the second video display; and communicating a request to display the at least one of the video frames to the first video display and the second video display.

* * * * *